April 1, 1924.
W. HEAPE ET AL
1,488,542
APPARATUS FOR OBTAINING PHOTOGRAPHIC RECORDS
Filed Dec. 9, 1920  5 Sheets-Sheet 1
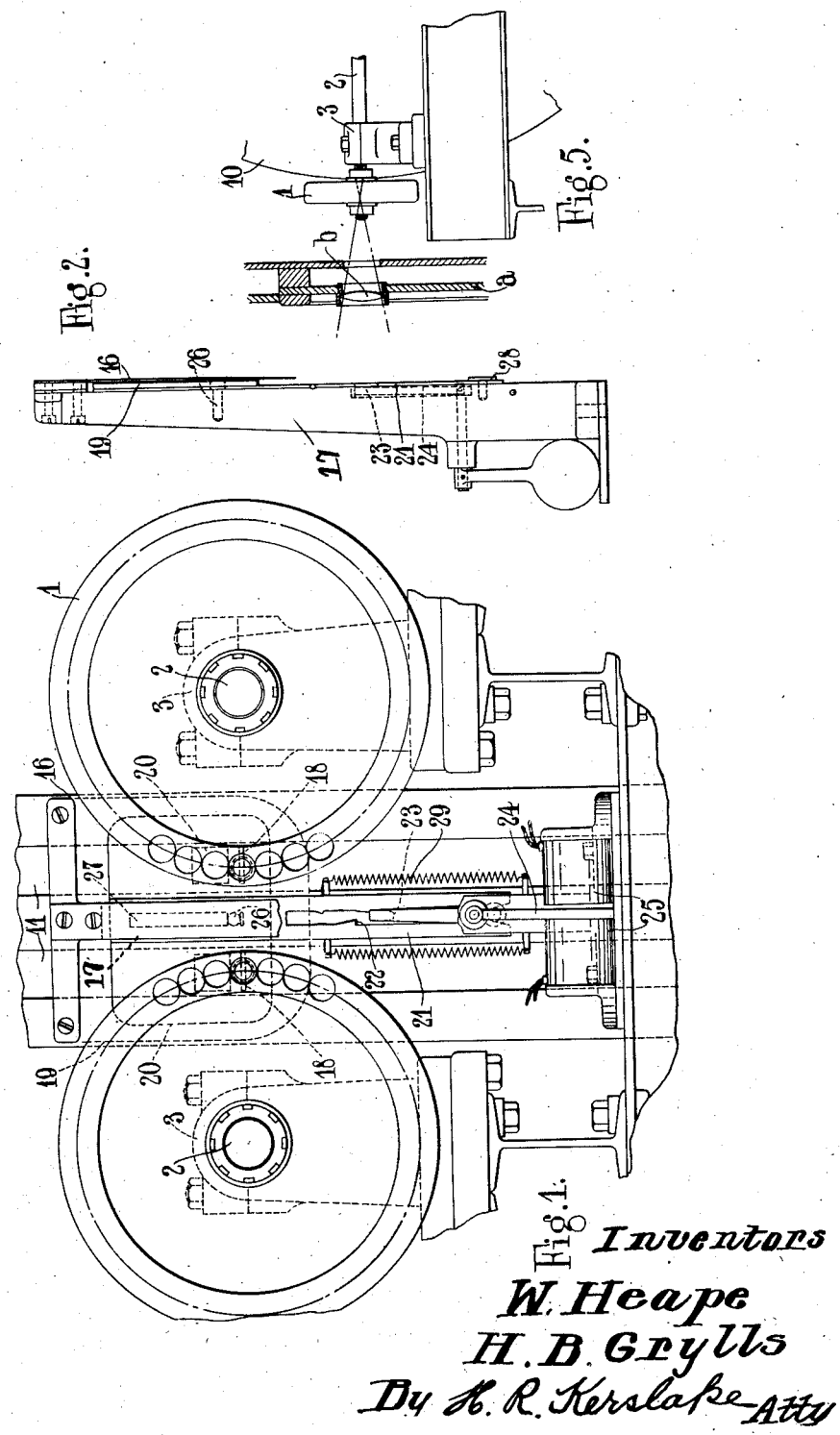
Inventors
W. Heape
H. B. Grylls
By H. R. Kerslake Atty

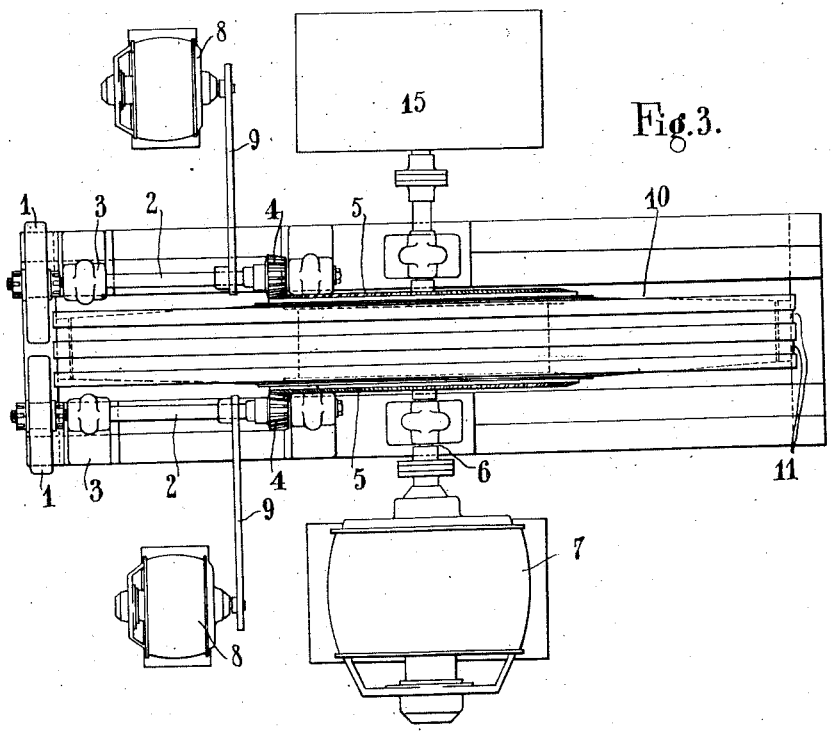

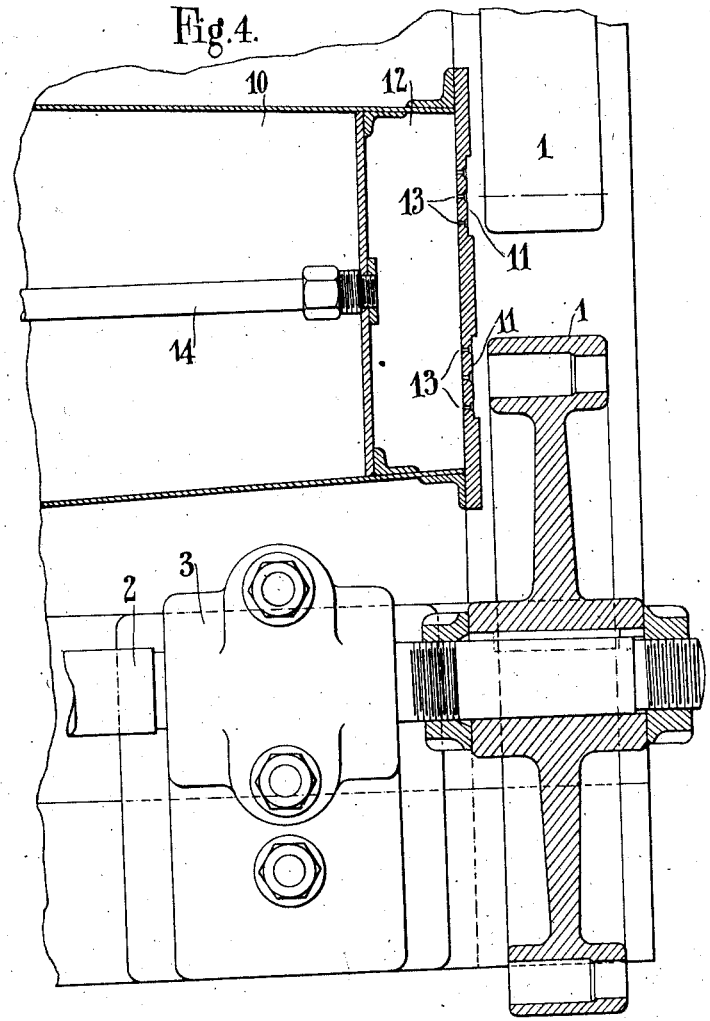

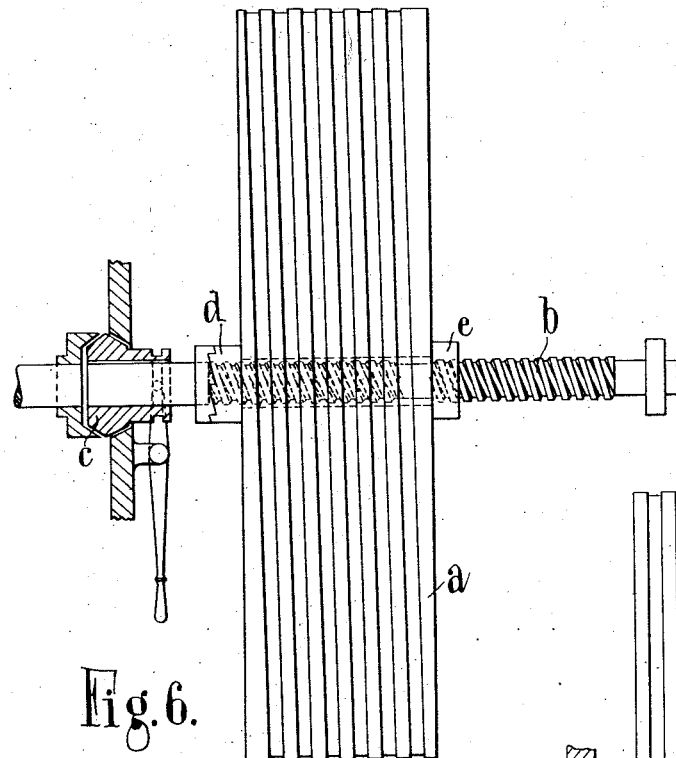
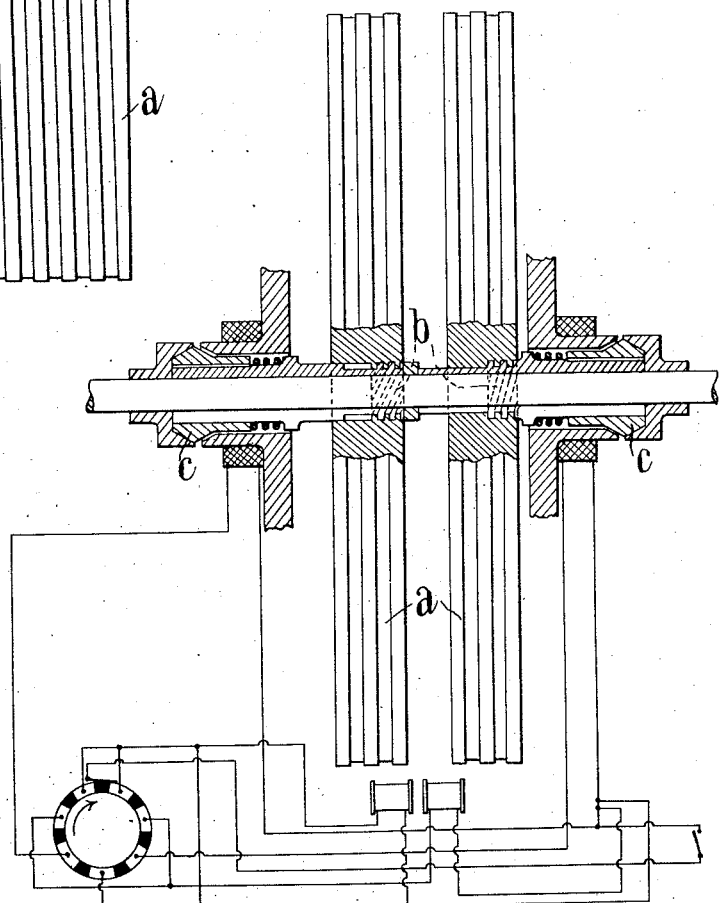

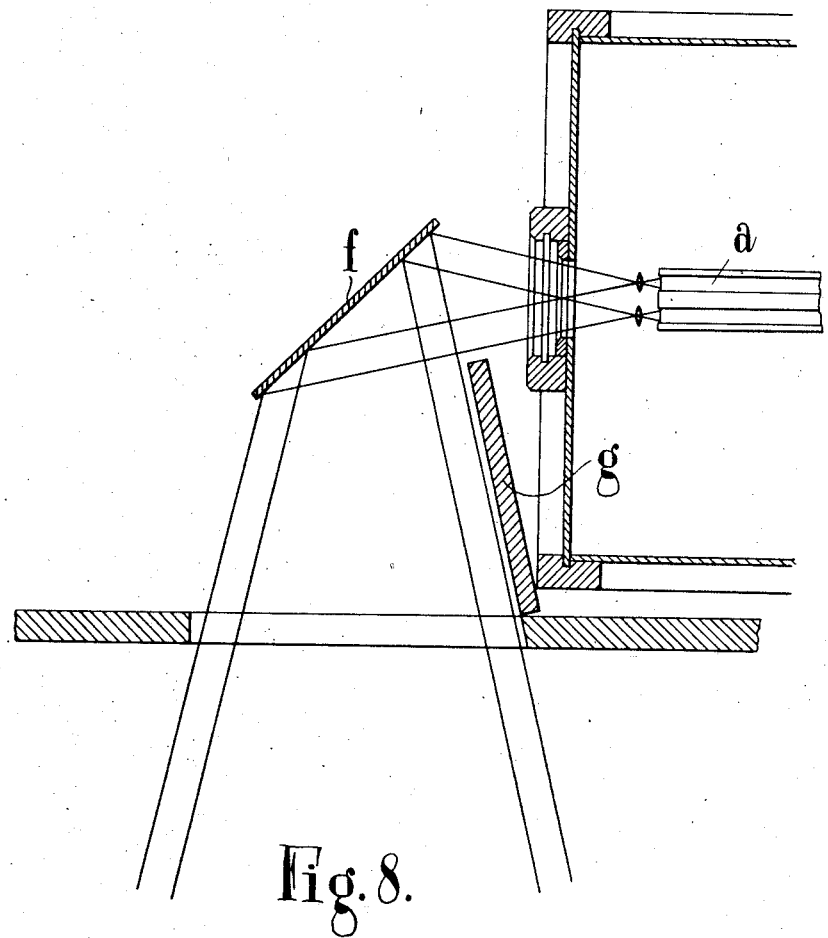

Patented Apr. 1, 1924.

1,488,542

UNITED STATES PATENT OFFICE.

WALTER HEAPE, OF LONDON, AND HORACE BERE GRYLLS, OF EASTBOURNE, ENGLAND.

APPARATUS FOR OBTAINING PHOTOGRAPHIC RECORDS.

Application filed December 9, 1920. Serial No. 429,559.

(GRANTED UNDER THE PROVISIONS OF THE ACT OF MARCH 3, 1921, 41 STAT. L., 1313.)

*To all whom it may concern:*

Be it known that we, WALTER HEAPE, a subject of the King of Great Britain and Ireland, and residing at 10 King's Bench Walk, Temple, London, E. C. 4, England, and HORACE BERE GRYLLS, a subject of the King of Great Britain and Ireland, and residing at Trenay Fawton, Carew Road, Eastbourne, in the county of Sussex, England, have invented a certain new and useful Apparatus for Obtaining Photographic Records, of which the following is a specification.

This invention has for its object to enable photographic records to be obtained of phenomena the duration of which is a very small interval of time, or which take place at a very high speed.

As specific examples it may be mentioned that by means of this invention photographic records of a kinematographic nature can be obtained of the bursting of projectiles, impact of projectiles on armour plate, effect of explosions, and of all kindred as well as many other classes of phenomena, which records can afterwards be examined directly or can be projected on to a screen to ascertain what took place during the time the operations were in progress.

It is obvious that for such records to be of real assistance the rate at which they must be taken should be of the order of thousands per second, while each separate record should be clearly defined, but it will also be understood that the invention is of equal value in connection with operations or phenomena which occur at a much lower rate.

An apparatus according to the invention consists broadly of three primary components:

(1) A rotary system such as a wheel or like member provided with lenses;

(2) A length of sensitive film carried by some suitable means, and (3) A member performing the functions of a shutter, the three components being so interconnected that they are operated in the correct relationships to give the desired results.

A further object of the invention is to construct apparatus of the above character in such a manner that focussing on an object is possible at any distance from the camera, and to obviate the blurring of the image caused by the shifting of the viewpoint.

A still further object of the present invention is to render the apparatus portable by providing a plurality of supports for the film so that it may be made to travel in the required path and at the requisite speed by transference from one support to another.

The invention also consists in a camera of the type described in which an additional stationary though possibly adjustable lens or lenses is or are used with the rotating lens system for the purpose of focussing at any desired distance.

The invention further consists in a portable camera of the type described in which suitable means are employed for passing the film from one spool to another over the rotating drum or through the desired path.

The invention further consists in the improved apparatus for obtaining photographic records hereinafter described.

A convenient construction of apparatus is illustrated in the accompanying drawings, in which—

Figure 1 is a front elevation, with certain parts removed to show the operating mechanism of the shutter.

Figure 2 is a side elevation of part of the shutter and allied parts as shown in Figure 1.

Figure 3 is a plan view.

Figure 4 is a part vertical section through the wheel of lenses and the drum carrying the photographic film.

Figure 5 is a fragmentary view illustrating a detail.

Fig. 6 is an elevation, partly in section, of a modified type of film carrying drum and actuating means therefor;

Fig. 7 is an elevation, partly in section of a further modification of the film actuating drum and actuating means therefor, illustrating diagrammatically the electric circuits for electromagnetically controlling the operation of the clutches;

Fig. 8 is a detail sectional view of an arrangement for reflecting the image being photographed.

As illustrated two wheels, discs or the like indicated at 1 provided with suitable apertures to receive lenses, are mounted on shafts 2 which are supported in bearings 3 and may be rotated by bevel wheels 4 meshing with bevel wheels 5 on a shaft 6 driven from an electric motor 7 or other suitable prime mover. The lens wheels may be capable of endways adjustment on their respective shafts for the purpose of focusing, and the shafts 2 may be provided with flexible couplings to reduce vibration in the apparatus to a minimum.

Since the speeds of revolution in such an apparatus as is herein described are usually high, it is better to drive the shafts 2 by separate motors 8, and a belt 9 or other device, in which case the bevels 4 and 5 merely serve the purpose of keeping the motors 7 and 8 in synchronism. A drum 10 is mounted on the shaft 6 and is rotated thereby such as by keying it to the shaft and/or securing it to the bevel wheels 5. The drum is provided with two peripheral recesses, channels or the like 11 to receive lengths of photographic films, which are prevented from moving outwards by suction. For this purpose the drum 10 is provided with peripheral chamber 12 having small apertures 13 leading through from the chamber 12 to grooves in the channels 11 outside of the drum, the chamber 12 being maintained at the desired degree of exhaustion by a pipe 14 leading to any suitable pump 15 operated by the shaft 6 or otherwise.

The wheels or discs 1 are arranged in front of a screen 16 carried on a pillar or other support 17 and provided with slot apertures 18. As will be seen from the drawings the slot apertures 18 are such that their dimension in the direction of movement of the film is substantially less than the height of the picture, and the function of such slot is twofold, namely, to limit distortion due to the fact that the lenses travel in an arc of a circle and also to limit the period of exposure of each picture in order to prevent blurring of the picture when the apparatus is called upon to deal with a rapidly moving objective such, for example, as a projectile. Mounted in front of the screen 16 is a sliding shutter 19 provided with apertures 20 which may be either in horizontal alignment or displaced vertically relatively to each other. The sliding shutter plate 19 is carried on a slotted or bifurcated bar 21 provided with teeth, shoulders or the like 22 to engage with a stud 23, carried on a lever 24 pivoted to the support 17 and adapted to be worked by electromagnets 25 the circuits of which are controlled by commutators or the like operated by synchronism with the lens carrying members and the drum such as by driving off the shafts 2 or by other means.

The shutter is guided during its fall by a stud 26 on the support 17 engaging in a slot 27 in the shutter plate, and by a stud 28 engaging in a slot of the bar 21. In order to secure a quick movement of the shutter, springs 29 are provided and connected to the bar 21 and to the support 17.

It will be observed that with the construction above described the lenses and the portions of the films exposed through the apertures move in the same direction, so that by suitably adjusting the speeds of the lens wheels and the drum, a lens, its image on the film, and the film all move at the same speed and in the same direction.

When the apparatus is to be used the shutter 19 is supported by the stud 23 engaging in the first tooth or shoulder of the bar 21, so that the shutter apertures 20 are out of register with the fixed apertures 18. On the desired electromagnets being energized the lever 24 is rocked to bring the stud 23 away from the aforesaid shoulder 22 and allow the shutter to fall until the stud engages with the second toothed shoulder, thereby bringing the apertures in register so that exposure of the film can take place. At the end of the predetermined time during which photographs are to be taken the other electromagnet is energized to remove the stud from the second shoulder of the bar 21 and allow it to drop in order again to bring the apertures out of register. Pairs of simultaneous photographs of stereoscopic nature are thus obtained which after development and other necessary treatment can be viewed directly or projected in a kinematograph, the observer being provided with a suitably perforated revolving shutter or with a two-colour screen.

By so placing the apertures in the sliding shutter plate 19 that by means of a third shoulder 22, similar to those described above, the apertures may be made to expose one complete length of film and then the other, the time during which photographs are being taken is doubled but stereoscopic results are not then possible.

Again, by displacing one wheel of lenses with regard to the other by a distance equivalent to half the "pitch" of the lenses, twice as many pictures will be taken (of course alternately on each film) in the same time as compared with those obtained by the normal arrangement of the lens wheels, and in this case stereoscopic effect is still available in a kinematograph.

In another form of apparatus such as illustrated in Fig. 6, a length of sensitive film is wound spirally on a drum $a$ which is continuously revolved through a clutch $c$ and ratchet $d$ and at the same time moved along its axis by a nut $e$ engaging a threaded spindle $b$ at the speed necessary to bring successive portions of the film into correct position.

When the clutch *c* is engaged, the drum *a* and spindle *b* rotate together but when the clutch is disengaged, the shaft remains stationary while the drum continues to rotate by reason of its own inertia and in consequence screws itself axially along the threaded spindle *b*.

In a modified form of apparatus illustrated in Fig. 7 the drum *a* is divided in halves or two drums provided and on each part two films are mounted. Each part of the drum is adapted at the proper time to be traversed along the axis so that each strip on each part of the drum can be exposed in the desired sequence.

Referring more particularly to Fig. 7, the drum is divided into two parts *a*, there being two spindles *b* and electromagnetically actuated clutches *c* for the respective spindles.

In such arrangement the outside strip on the left part of the drum may be exposed first, then the corresponding inside strip on the right part of the drum. As soon as this latter strip begins to be exposed the left part of the drum begins to be displaced by a friction clutch or other suitable means in such a way that the inner strip on the left part of the drum will occupy the position which was originally held by the outside strip, when the exposure of the second strip is complete.

As soon as the second strip has been exposed the unexposed strip of the left part of the drum becomes exposed, the right part of the drum is now displaced similarly to the left part and the unexposed strip on the right part becomes exposed in its proper turn. It is seen by such an arrangement that the total time of exposure can be increased without making the apparatus unduly large and without sacrificing the speed at which the records were taken or the clearness of the same.

By a suitable construction of the commutator such as suggested in Fig. 7 all the operations involved in obtaining the photographic records can be conducted in their correct sequence, and in the case of projectiles and explosives the firing of the same and the ignition of a flashlight if such is used can thus be controlled.

As illustrated in Fig. 7, it is possible when necessary to place the apparatus *a* behind a splinter-proof shelter *g*, and take the photographs by reflection in a mirror *f*, so that no part of the apparatus can be damaged by splinters.

When the lens wheels are not movable axially for focussing, this operation may be effected by the use of one or more supplementary lenses, for which purpose we provide in front of the rotating lens a suitable frame *a* which may or may not form part of the casing or housing of the apparatus and in which a number of stationary focussing lenses *b* can be placed, so that when such stationary lenses are employed the lens or the camera is a compound lens consisting of one or more stationary lenses and a rotating lens or lenses carried by the rotating disc.

The size of any such stationary lens as is employed should be such that at the position at which it is placed relatively to the rotating lenses its field is at least sufficient to use the full aperture of the operating rotating lens throughout its entire period of action.

In a fixed instrument such as that described above, the rotating lenses may be of half an inch diameter, two inch focus with F 4 aperture, the film being of standard size giving photographs one inch in width and 0.75 of an inch in length, but it will be understood that these sizes are given by way of example and not of limitation.

It is of course understood that the apparatus hereinbefore described may be modified according to specific requirements without in any way departing from the spirit and scope of the invention.

Having now described our invention what we claim as new and desire to secure by Letters Patent is:—

1. Apparatus for obtaining photographic records comprising in combination, a movable support for a sensitive film, a plurality of lenses rotatable about an axis substantially perpendicular to the plane of that part of the film exposed through the lenses, means for limiting the exposure of each picture and means for limiting the number of successive exposures.

2. Apparatus for obtaining photographic records comprising in combination a movable support for a sensitive film, a plurality of lenses rotatable about an axis substantially perpendicular to the plane of that part of the film exposed through the lenses, a member interposed between the lenses and film and having an opening therein of which the dimension in the direction of movement of the film is substantially less than the height of the picture, and a shutter device for controlling the number of successive exposures.

3. Apparatus for obtaining photographic records comprising in combination a movable support for a sensitive film, a plurality of lenses through which said film is exposed in succession, a wheel carrying said lenses rotatable about an axis substantially perpendicular to the plane of the film at that part where it is exposed through the lenses, a member interposed between the lenses and film and having an opening therein of which the dimension in the direction of movement of the film is substantially less than the height of the picture and a shutter device for controlling the number of successive exposures through said opening.

4. Apparatus for obtaining photographic records comprising a movable support for a sensitive film, a plurality of lenses rotatable about an axis, substantially perpendicular to the plane of the film on that part where it is exposed through said lenses, means for moving the film and lens system so that the portion of the film receiving the image formed by a lens moves at the same velocity and in the same direction as the image formed by the lens, a member interposed between the lenses and film and having an opening therein of which the dimension in the direction of movement of the film is substantially less than the height of the picture and a shutter device for controlling the number of successive exposures through said opening.

5. Apparatus for obtaining photographic records comprising a drum to which is secured a sensitive film, a rotary lens system rotatable about an axis substantially perpendicular to the axis of said drum and shutter mechanism controlling the exposure of said film.

6. Apparatus for obtaining photographic records comprising a rotatable drum to which is secured a sensitive film, a wheel rotatable about an axis substantially perpendicular to the axis of said drum, a plurality of lenses carried on said wheel and shutter mechanism controlling the exposure of said film.

7. Apparatus for obtaining photographic records comprising a rotary lens system, a rotatable drum, means for retaining a sensitive film thereon by suction and shutter mechanism controlling the exposure of said film.

8. Apparatus for obtaining photographic records comprising a rotatable lens system, a sensitive film movable past said lenses in a plane substantially perpendicular to the axis about which the lens system rotates, and electromagnetically actuated shutter mechanism for controlling the exposure of said film.

9. Apparatus for obtaining photographic records comprising a rotatable lens system, a sensitive film movable past said lenses in a plane substantially perpendicular to the axis about which the lens system rotates, a member interposed between the lenses and film and having an opening therein of which the dimension in the direction of movement of the film is substantially less than the height of the picture, shutter mechanism for controlling the number of successive exposures of the film through said opening and means for focussing said lenses.

10. Apparatus for obtaining photographic records comprising a rotatable lens system, a sensitive film movable past said lenses in a plane substantially perpendicular to the axis about which the lens system rotates, a member interposed between the lenses and film and having an opening therein of which the dimension in the direction of movement of the film is substantially less than the height of the picture, shutter mechanism for controlling the number of successive exposures of said film through said opening and means for mounting a supplementary lens for focussing.

11. Apparatus for obtaining photographic records comprising a rotary member, a plurality of lenses carried by said rotary member, a second rotary member, a sensitive film secured to said second rotary member, means for rotating each of said rotary members, a member interposed between the lenses and film and having an opening therein of which the dimension in the direction of movement of the film is substantially less than the height of the picture and shutter mechanism for controlling the number of successive exposures of said film through said opening.

12. Apparatus for obtaining photographic records comprising a rotary member, a plurality of lenses carried by said rotary member, a second rotary member, a sensitive film secured to said second rotary member, means for rotating each of said rotary members, and electromagnetically operated shutter mechanism for controlling the exposure of said film.

13. Apparatus for obtaining photographic records comprising a rotary lens system, a non-rotary lens system for focussing, a sensitive film movable past the lens system in a plane substantially perpendicular to the axis about which said lens system rotates, a member interposed between the lenses and film and having an opening therein of which the dimension in the direction of movement of the film is substantially less than the height of the picture and shutter mechanism for controlling the number of successive exposures of said film through said opening.

14. Apparatus for obtaining photographic records comprising a rotary member, a plurality of lenses carried thereby, a drum, a sensitive film attached to said drum, means for rotating said drum about an axis substantially parallel to the plane in which the lenses rotate, and shutter mechanism for controlling the exposure of said film.

15. Apparatus for obtaining photographic records comprising a rotary member, a plurality of lenses carried thereby, a second rotary member adapted to carry a sensitive film, suction means for holding said film on said drum and shutter mechanism for controlling the exposure of said film.

16. Apparatus for obtaining photographic records comprising a rotary member, a plurality of lenses carried thereby, a second rotary member adapted to carry a sensitive film, suction means for holding said film on said drum and electromagnetically operated shutter mechanism for controlling the exposure of said film.

17. Apparatus for obtaining photographic records comprising a wheel, a plurality of lenses carried by said wheel, means for rotating said wheel, a drum, means for rotating said drum, a sensitive film secured to said drum, and shutter mechanism for controlling the exposure of said film.

18. Apparatus for obtaining photographic records comprising a rotary lens system, a movable sensitive film support, a non-rotary lens system for focussing, and electromagnetically operated shutter mechanism for controlling the exposure of said film.

In testimony whereof we have signed our names to this specificaiton.

WALTER HEAPE.
HORACE BERE GRYLLS.